United States Patent
Lee

(10) Patent No.: US 6,967,521 B2
(45) Date of Patent: Nov. 22, 2005

(54) TEMPERATURE DETECTING CIRCUIT

(75) Inventor: Jung Hwa Lee, Seoul (KR)

(73) Assignee: Hynix Semiconductor Inc., Kuyngki-Do (KR)

( * ) Notice: Subject to any disclaimer, the term of this patent is extended or adjusted under 35 U.S.C. 154(b) by 0 days.

(21) Appl. No.: 10/732,430

(22) Filed: Dec. 10, 2003

(65) Prior Publication Data

US 2004/0239371 A1    Dec. 2, 2004

(30) Foreign Application Priority Data

May 28, 2003    (KR) ...................... 10-2003-0034128

(51) Int. Cl.$^7$ .............................................. H03K 3/42
(52) U.S. Cl. ...................... 327/512; 327/513; 327/262
(58) Field of Search ................................ 327/262, 270, 327/271, 83, 138, 378, 512, 538, 513, 515, 327/525

(56) References Cited

U.S. PATENT DOCUMENTS

| | | | |
|---|---|---|---|
| 5,360,268 A | * | 11/1994 | Hayashi et al. ............. 374/117 |
| 5,994,937 A | * | 11/1999 | Hara et al. ................... 327/262 |
| 6,369,318 B1 | * | 4/2002 | Uchida et al. ................ 174/36 |
| 6,449,006 B1 | * | 9/2002 | Shipp .......................... 348/70 |
| 6,593,791 B1 | * | 7/2003 | Weintraub ................... 327/262 |
| 6,621,320 B2 | * | 9/2003 | Wong et al. ................. 327/262 |
| 6,815,995 B2 | * | 11/2004 | Ajit ............................. 327/262 |
| 6,822,504 B2 | * | 11/2004 | Morikawa .................... 327/513 |
| 6,876,623 B1 | * | 4/2005 | Lou et al. .................... 370/208 |
| 6,885,229 B2 | * | 4/2005 | Okuno et al. ................ 327/172 |
| 6,900,828 B2 | * | 5/2005 | Ramaswamy et al. ........ 348/21 |

* cited by examiner

*Primary Examiner*—Tuan T. Lam
*Assistant Examiner*—Hiep Nguyen
(74) *Attorney, Agent, or Firm*—Marshall, Gerstein & Borun LLP

(57) ABSTRACT

A temperature detecting circuit includes a first delay unit for outputting a reference signal, a second delay unit for outputting a plurality of delay signals, a detecting unit for outputting a plurality of detecting signals according to the reference signal and delay signals, an encoder for encoding the plurality of the detecting signals, a buffer for outputting the output signal of the encoder to the outside and a fuse information from the outside to a select means, and the select unit that can be programmed according to the fuse information, for outputting a plurality of output signals to the detecting means according to a program state.

11 Claims, 4 Drawing Sheets

TEMPERATURE DETECTING CIRCUIT

BACKGROUND

1. Field of the Invention

The present invention relates to a temperature detecting circuit and, more particularly, to a temperature detecting circuit that can be exactly implemented since trimming is possible depending on variation in process or voltage and that can significantly reduce consumption of the standby current since the refresh period is differentiated depending on temperature, in such a manner that the width of variation in temperature that can be detected by the temperature detecting circuit can be widened using a plurality of detectors, the status of the plurality of the detectors can be detected at the outside by an encoder, and one of the detectors that can detect correct temperature information by transferring fuse trimming information from the outside to the detecting means via the select means.

2. Discussion of Related Art

In semiconductor devices, if a device requiring a periodical refresh so as to keep data is needed, a large amount of standby current is necessary for a self-refresh. The refresh period that is actually required, however, very differs depending on temperature. If temperature is detected and the refresh period is varied depending on temperature, the standby current can be significantly reduced. The exactness of a common temperature detecting circuit, however, is lowered depending on variation in external conditions such as process, voltage, and the like.

FIG. 1 is a block diagram illustrating the construction of a conventional temperature detecting circuit.

A first delay means 11 receives an input signal (IN) as an input to output a reference signal (ref) depending on temperature that will be detected without being influenced by variation in operating environments such as change in process, voltage, temperature, etc. A second delay means 12 outputs a delay signal (tem) whose delay value is changed depending on variation in temperature. A detector 13 receives the reference signal (ref) from the first delay means 11 and the delay signal (tem) from the second delay means 12, as an input and then outputs (dout) a detecting signal (det) indicating whether the delay signal (tem) is lower or higher the reference signal (ref) to the outside through a DQ buffer 14.

As such, the detection width of temperature is controlled by correcting the delay width of the first delay means 11 or the second delay means 12 using the data outputted via the DQ buffer 14.

In the conventional temperature detecting circuit constructed above, however, since only one detector is employed, the width of variation in temperature that can be detected depending on variation in process or voltage is limited. Therefore, if the width of variation in temperature that can be actually detected by a device is large, the device fails to serve as the temperature detecting circuit.

SUMMARY OF THE INVENTION

The present invention is contrived to solve the aforementioned problems. The present invention is directed to provide a temperature detecting circuit that can widely control the width of variation in temperature depending on variation in process or voltage by use of a plurality of detectors.

According to a preferred embodiment of the present invention, there is provided a temperature detecting circuit wherein the state of a plurality of detectors can be detected externally using an encoder.

Further, the present invention is to provide a temperature detecting circuit that can select a detector capable of detecting correct temperature information by allowing fuse trimming information to be transferred via a select means so that correct temperature information can be transferred to a device from the outside.

According to a preferred embodiment of the present invention, there is provided A temperature detecting circuit, comprising: a first delay means for outputting a reference signal that is delayed by some time according to an input signal without being affected by variation in temperature; a second delay means for delaying the input signal in different delay time according to variation in temperature to generate a plurality of delay signals; a detecting means for comparing the reference signal and the plurality of the delay signals, respectively, to output a plurality of detecting signals; an encoder for encoding the plurality of the detecting signals into given numbers of output signals; a buffer for outputting the output signal of the encoder to the outside and receiving a control signal from the outside as an input; and a select means that can be programmed according to the control signal, for selecting one of the detecting signals according to a program state.

One aspect of the present invention is to provide a temperature detecting circuit, comprising: a first delay means for outputting a reference signal that is delayed by some time according to an input signal without being affected by variation in temperature; a second delay means for delaying the input signal in different delay time according to variation in temperature to generate a plurality of delay signals; a detecting means having a plurality of detectors, wherein the detector compares the reference signal and the plurality of the delay signals, respectively, to output a plurality of detecting signals; an encoder for encoding the plurality of the detecting signals into given numbers of output signals; a buffer for outputting the output signal of the encoder to the outside and receiving a control signal from the outside as an input; and a select means having a plurality of fuses that can be cut, for cutting the fuses according to the control signal and selecting one of the plurality of the detectors according to the fuse signal depending on the state of the fuse.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF PREFERRED EMBODIMENTS

Figure 1:
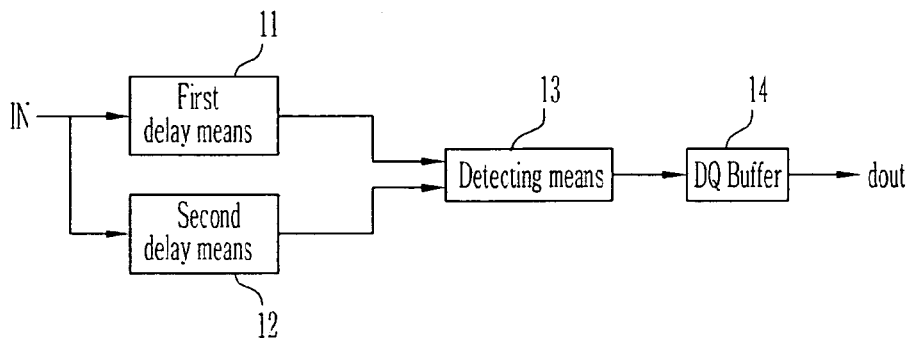
FIG. 1 is a block diagram illustrating the construction of a conventional temperature detecting circuit.

The present invention will now be described in detail in connection with preferred embodiments with reference to the accompanying drawings, in which like reference numerals are used to identify the same or similar parts.

Figure 2:
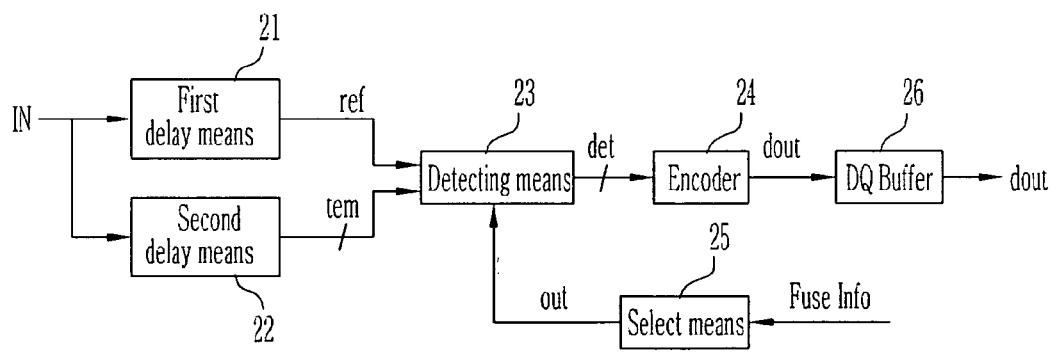
FIG. 2 is a block diagram illustrating the construction of a temperature detecting circuit according to the present invention.

FIG. 2 is a block diagram illustrating the construction of a temperature detecting circuit according to the present invention.

A first delay means 21 outputs a reference signal (ref) that is delayed by some time according to an input signal (IN) without being affected by variation in operating environments such as variation in temperature, etc. The reference signal (ref) is fixed to temperature to be detected and becomes a signal indicating that temperature.

A second delay means 22 changes the value of the input signal (IN) that is delayed according to on variation in temperature. The second delay means 22 outputs a delay signal corresponding temperature to be detected and a plurality of delay signals (tem) corresponding to temperature for which a sufficient margin is taken into consideration on the basis of that temperature to be detected.

A detecting means 23 consists of a plurality of detectors. Each of the detectors uses the reference signal (ref) inputted from the first delay means 21 and the plurality of the delay signals (tem) inputted from the second delay means 22 to detect whether the delay signal (tem) is higher or lower than the reference signal (ref), and then outputs a detecting signal (det).

The detecting signal (det) outputted from the detecting means 23 has temperature information that is currently being measured in a device. In order to output such temperature information to the outside, the encoder 24 encodes temperature information to output a plurality of output signals (dout). The plurality of the output signals (dout) outputted by the encoder 24 are provided as information to the outside through a DQ buffer 26. It is confirmed whether such information matches external environments. At this time, if actual temperature and temperature that is being recognized in the device are different, fuse information (Fuse Info) is provide to a select means 25 so that the detecting means 23 within the device that actually recognizes external temperature can be selected.

The select means 25 may have a programmable fuse. The select means 25 cuts the fuse depending on fuse information (Fuse Info), combines signals depending on the result to produce information for allowing the means 25 to select one detector that must be used by the device, and then transfers such information to the detecting means 23. Based on information thus transferred, only one of the plurality of the detectors in the detecting means 23 is enabled and remaining detectors are disabled. Only the signal detected in the selected detector is thus outputted through the encoder 24 and the DQ buffer 26.

Figure 3:
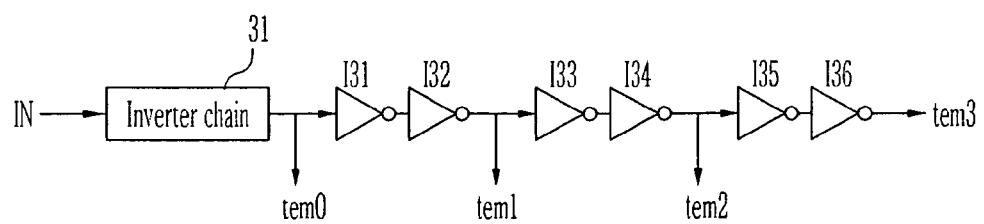
FIG. 3 is a block diagram illustrating the detailed construction of the second delay means shown in FIG. 2 according to an embodiment of the present invention.

FIG. 3 is a block diagram illustrating the detailed construction of the second delay means shown in FIG. 2 according to an embodiment of the present invention.

An inverter chain 31 delays the input signal (IN) by some time to output a first delay signal (tem0). The first delay signal (tem0) is delayed through first and second inverters I31 and I32 to become a second delay signal (tem1). The second delay signal (tem1) is delayed through third and fourth inverters I33 and I34 to become a third delay signal (tem2). The third delay signal (tem2) is delayed through fifth and sixth inverters I35 and I36 to become a fourth delay signal (tem3).

In the above, the delay value is extended to some degree depending on a given difference in temperature, by means of the first and second inverters I31 and I32, the third and fourth inverters I33 and I34, and the fifth and sixth inverters I35 and I36. It is thus possible to identify the difference in temperature.

Figure 4:
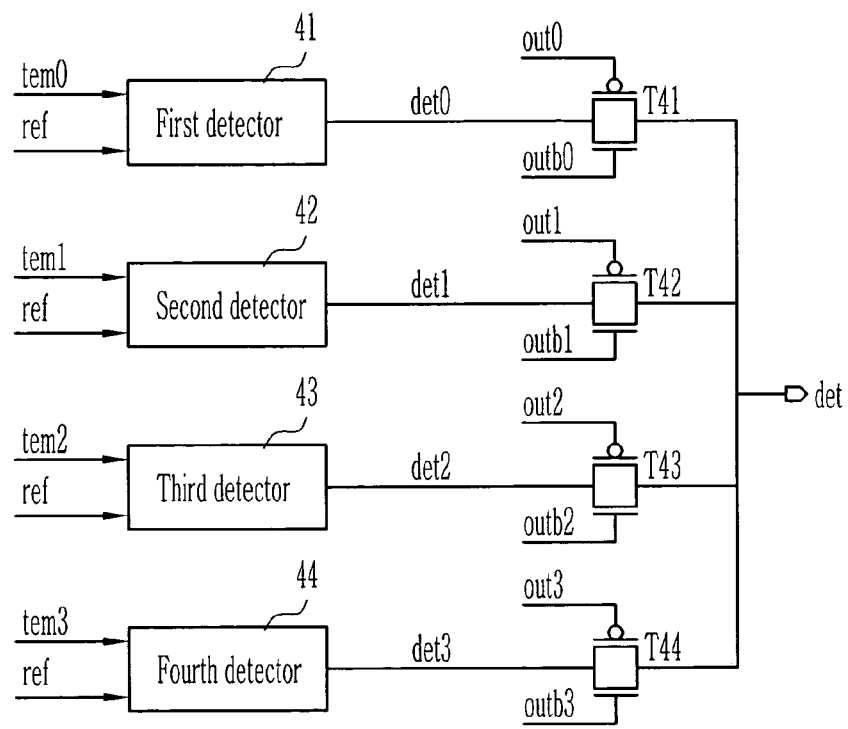
FIG. 4 is a block diagram illustrating the detailed construction of the detecting means shown in FIG. 2 according to an embodiment of the present invention.

FIG. 4 is a block diagram illustrating the detailed construction of the detecting means 23 shown in FIG. 2 according to an embodiment of the present invention.

A first detector 41 uses the first delay signal (tem0) outputted from the second delay means and the reference signal (ref) outputted from the first delay means to output a first detecting signal (det0). A second detector 42 uses the second delay signal (tem1) outputted from the second delay means and the reference signal (ref) outputted from the first delay means to output a second detecting signal (det1). A third detector 43 uses the third delay signal (tem2) outputted from the second delay means and the reference signal (ref) outputted from the first delay means to output a third detecting signal (det2). A fourth detector 44 uses the fourth delay signal (tem3) outputted from the second delay means and the reference signal (ref) outputted from the first delay means to output a fourth detecting signal (det3).

A first transfer gate T41 outputs the first detecting signal (det0) as the final detecting signal (last_det) according to the first output signal (out0) of the encoder and its inverse signal (outb0). A second transfer gate T42 outputs the second detecting signal (det1) as the final detecting signal (last_det) according to the second output signal (out1) of the encoder and its inverse signal (outb1). A third transfer gate T43 outputs the third detecting signal (det2) as the final detecting signal (last_det) according to the third output signal (out2) of the encoder and its inverse signal (outb2). A fourth transfer gate T44 outputs the fourth detecting signal (det3) as the final detecting signal (det) according to the fourth output signal (out3) of the encoder and its inverse signal (outb3).

In the detecting means constructed above, at the initial stage, the first to fourth output signals (out0 to out3) are encoded by the encoder 24 and are then outputted to the outside by the DQ buffer 26. However, only one of the first to fourth transfer gates T41 to T44 is turned on according to the output signal of the select means 25 by fuse information (Fuse Info) externally inputted, and only one of the detecting signals (det0 to det3) of the first to fourth detectors 41 to 44 is outputted to the outside.

Figure 5:
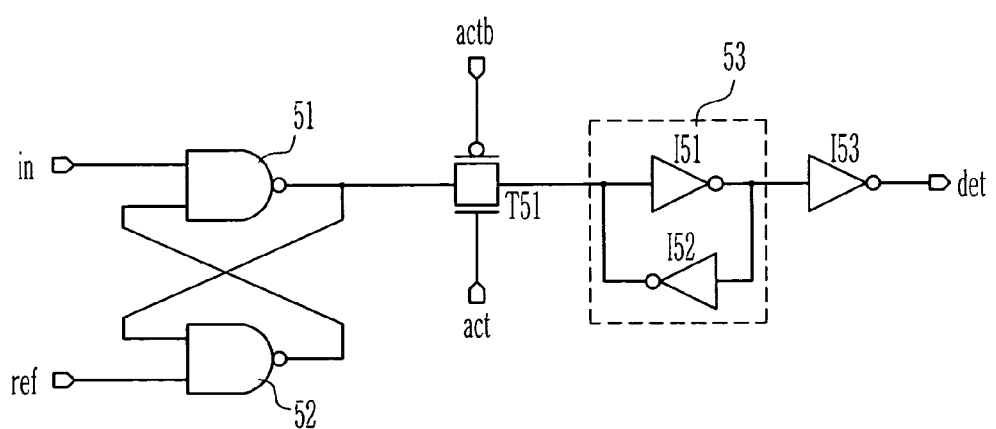
FIG. 5 is a block diagram illustrating the detailed construction of the detector shown in FIG. 4 according to an embodiment of the present invention.

FIG. 5 is a block diagram illustrating the detailed construction of the detector shown in FIG. 4 according to an embodiment of the present invention.

A first NAND gate 51 performs a NAND operation for an input signal (in) and the output signal of a second NAND gate 52. A second NAND gate 52 performs a NAND operation for the reference signal (ref) and the output signal of the first NAND gate 51. In the above, the input signal (in) is one of the first to fourth delay signals outputted from the second delay means and the reference signal (ref) is a signal inputted from the first delay means. The first transfer gate T51 is driven according to a control signal (act) and its inverse signal (actb) to transfer the output signal of the first NAND gate 51. Further, a latch 53 having first and second inverters I51 and I52 latches the output signal of the first NAND gate 51 that is transferred via the first transfer gate T51. A third inverter I53 inverts the data that was latched by the latch 53 to output an inverse signal, which is a detecting signal (det).

Figure 6:
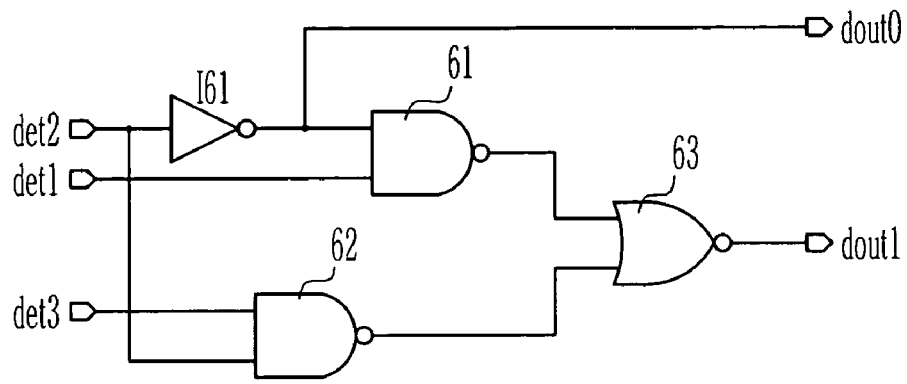
FIG. 6 is a block diagram illustrating the detailed construction the encoder shown in FIG. 2 according to an embodiment of the present invention.

FIG. 6 is a block diagram illustrating the detailed construction the encoder 24 shown in FIG. 2 according to an embodiment of the present invention.

A first inverter I61 inverts the second detecting signal (det2) outputted from the second detector of the detecting means to produce a first output signal (dout0). A first NAND gate 61 performs a NAND operation for the output signal of the first inverter I61 and the first detecting signal (det1) outputted from the first detector of the detecting means. A second NAND gate 62 performs a NAND operation for the second detecting signal (det2) and the third detecting signal (det3) outputted from the third detector of the detecting means. A NOR gate 63 performs a NOR operation for the output signals of the first NAND gate 61 and the second NAND gate 62 to output a second output signal (dout1).

Figure 7A:
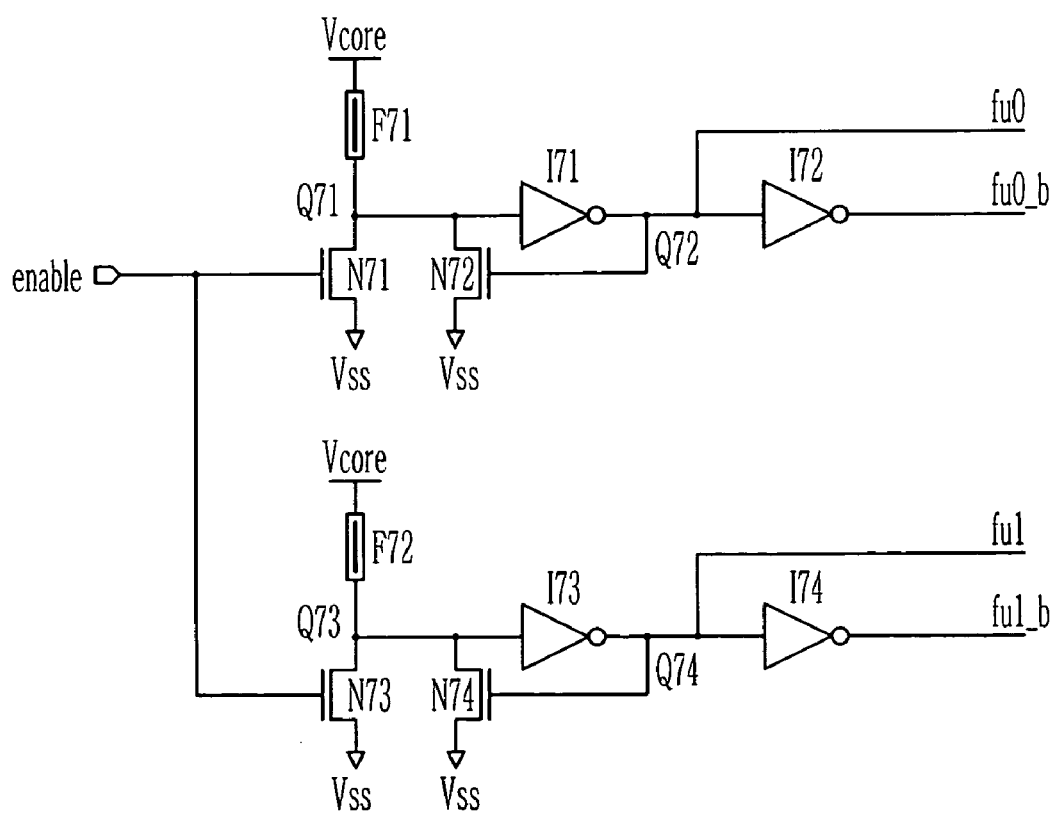
FIGS. 7A and 7B are block diagrams illustrating the detailed construction of the select means shown in FIG. 2 according to an embodiment of the present invention.
Figure 7B:
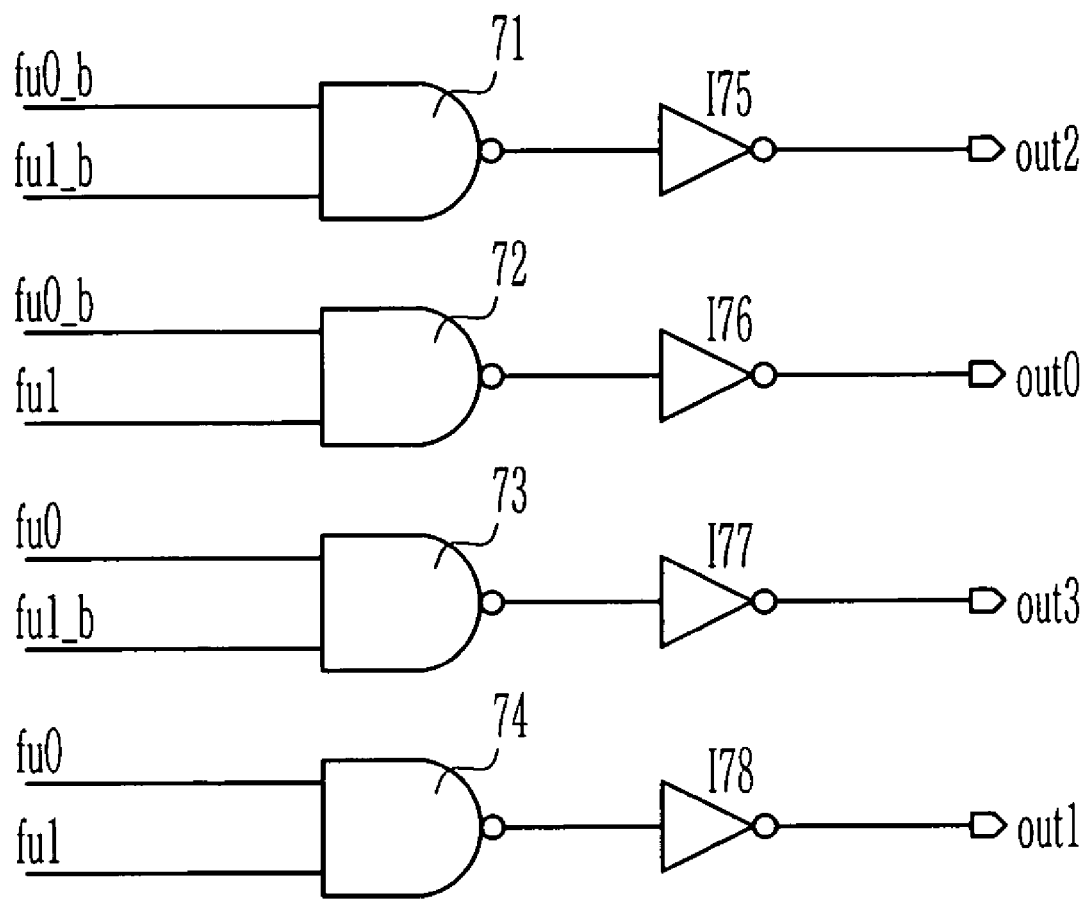

FIG. 7A and 7B are block diagrams illustrating the detailed construction of the select means 25 shown in FIG. 2 according to an embodiment of the present invention, wherein FIG. 7A is a circuit diagram illustrating a fuse signal generating means and FIG. 7B is a circuit diagram illustrating a select signal generating means.

Referring to FIG. 7A, a first fuse F71 is connected between the power supply terminal (Vcore) and a first node Q71. A first NMOS transistor N71) driven by an enable signal (enable) and a second NMOS transistor N72 driven by the potential of a second node Q72 are connected in parallel between the first node Q71 and the ground terminal (Vss). A first inverter I71 inverts the potential of the first node Q71 to decide the potential of the second node Q72. The potential of the second node Q72 becomes a first fuse signal (fu0). Furthermore, the potential of the second node Q72 is inverted through the second inverter I72 and is then outputted as a first fuse bar signal (fu0_b).

Meanwhile, a second fuse F72 is connected between the power supply terminal (Vcore) and a third node Q73. A third NMOS transistor N73 driven by the enable signal (enable) and a fourth NMOS transistor N74 driven by the potential of a fourth node Q74 are connected in parallel between the third node Q73 and the ground terminal (Vss). A third inverter I73 inverts the potential of the third node Q73 to decide the potential of the fourth node Q74 and the potential of the fourth node Q74 becomes a second fuse signal (fu1). Furthermore, the potential of the fourth node Q74 is inverted through the fourth inverter I74 and is then outputted as a second fuse bar signal (fu1_b).

By reference to FIG. 7B, a first NAND gate 71 performs a NAND operation for the first fuse bar signal (fu0_b) and the second fuse bar signal (fu1_b) and a fifth inverter I75 inverts the output signal of the first NAND gate 71 to output a third output signal (out2). A second NAND gate 72 performs a NAND operation for the first fuse bar signal (fu0_b) and the second fuse signal (fu1) and a sixth inverter I76 inverts the output signal of the second NAND gate 72 to output a first output signal (out0). A third NAND gate 73 performs a NAND operation for the first fuse signal (fu0) and the second fuse bar signal (fu1_b) and a seventh inverter I77 inverts the output signal of the third NAND gate 73 to output a fourth output signal (out3). Furthermore, a fourth NAND gate 74 performs a NAND operation for the first fuse signal (fu0) and the second fuse signal (fu1) and an eighth inverter I78 inverts the output signal of the fourth NAND gate 74 to output a second output signal (out1).

The select means constructed above selectively cuts the first and second fuses F71 and F72 according to fuse information (Fuse Info) and, according to its result, selects one of the plurality of the detectors 31 to 34 constituting the detecting means 23. The operation when only the fuse F71 is cut according to fuse information (Fuse Info) will now be described by way of an example.

If the first NMOS transistor N71 is turned on by the enable signal (enable), the first node Q71 keeps a LOW state since the first fuse F71 is cut. The potential of the first node Q71 keeping the LOW state is inverted to a HIGH state through the first inverter I71 and the potential of the second node Q72 keeping the HIGH state becomes the potential of the first fuse signal (fu0). Further, the second NMOS transistor N72 is turned on by the potential of the second node Q72 and the potential of the second node Q72 is inverted to a LOW state through the second inverter I72 to become the potential of the first fuse bar signal (fu0_b).

Meanwhile, if the third NMOS transistor N73 is turned on by the enable signal (enable), the third node Q73 keeps a HIGH state since the second fuse F72 keeps a normal state. The potential of the third node Q73 keeping the HIGH state is inverted to a LOW state through the third inverter I73 and the potential of the fourth node Q74 keeping the LOW state becomes the potential of the second fuse signal (fu1). Furthermore, the fourth NMOS transistor N74 is turned off by the potential of the fourth node Q74 and the potential of the fourth node Q74 is inverted to a HIGH state through the fourth inverter I74 to become the potential of the second fuse bar signal (fu2_b).

The first fuse bar signal (fu0_b) of the LOW state and the second fuse bar signal (fu1_b) of the HIGH state are inputted to the first NAND gate 71. The first NAND gate 71 then performs a NAND operation for the two signals (fu0_b and fu1_b) to output a signal of a HIGH state. The output signal of the first NAND gate 71 keeping the HIGH state is inverted to the LOW state through the fifth inverter I75 to become the third output signal (out2). The first fuse bar signal (fu0_b) of the LOW state and the second fuse signal (fu1) of the LOW state are inputted to the second NAND gate 72. The second NAND gate 72 performs a NAND operation for the two signals (fu0_b and fu1) to output a signal of a HIGH state. The output signal of the second NAND gate 72 keeping the HIGH state is inverted to a LOW state through the sixth inverter I76 to become the first output signal (out0). The first fuse signal (fu0) of the HIGH state and the second fuse bar signal (fu1_b) of the HIGH state are inputted to the third NAND gate 73. The third NAND gate 73 performs a NAND operation for the two signals (fu0 and fu1_b) to output a signal of a LOW state. The output signal of the third NAND gate 73 keeping the LOW state is inverted to a HIGH state through the seventh inverter I77 to become the fourth output signal (out3). The first fuse signal (fu0) of the LOW state and the second fuse signal (fu1) of the LOW state are inputted to the fourth NAND gate 74. The fourth NAND gate 74 performs a NAND operation for the two signals (fu0 and fu1) to output a signal of a HIGH state. The output signal of the fourth NAND gate 74 keeping the HIGH state is inverted to a LOW state through the eighth inverter I78 to become a second output signal (out1).

As described above, according to the present invention, the width of variation in temperature that can be detected by a temperature detecting circuit using a plurality of detectors. The state of the plurality of the detectors can be detected using the encoder from the outside. Fuse trimming information is transferred from the outside to the detector though the select means to select one of the detectors that can detect correct temperature information. Therefore, the present invention has new effects that it can implement a correct temperature detecting circuit since trimming is possible depending on variation in process or voltage and it can significantly reduce consumption of the standby current since the refresh period can be differentiated depending on each temperature.

Although the present invention has been described in connection with the embodiment of the present invention illustrated in the accompanying drawings, it is not limited thereto. It will be apparent to those skilled in the art that various substitutions, modifications and changes may be made thereto without departing from the scope and spirit of the invention.

What is claimed is:

1. A temperature detecting circuit, comprising:
   a first delay means for outputting a reference signal that is delayed by some time according to an input signal without being affected by variation in temperature;
   a second delay means for delaying the input signal in different delay time according to variation in temperature to generate a plurality of delay signals;
   a detecting means for comparing the reference signal and the plurality of the delay signals, respectively, and generating a plurality of detecting signals corresponding to the result of the comparison;
   an encoder for encoding the plurality of the detecting signals into given numbers of output signals;
   a buffer for outputting the output signal of the encoder to the outside; and
   a select means coupled to the buffer, is programmed according to a fuse information, for outputting a plurality of output signals to the detecting means according to a program state,
   wherein the detecting means outputs one of the detecting signals in response to the output signals of the select means after the select means is programmed.

2. The temperature detecting circuit as claimed in claim 1, wherein the detecting means comprises:
   a plurality of detectors for comparing the reference signal and the plurality of the delay signals, respectively, to output the plurality of the detecting signals; and
   a plurality of transfer gates having the same number as the detector, for outputting one of the plurality of the detecting signals according to the output signal of the select means.

3. The temperature detecting circuit as claimed in claim 1, wherein the select means comprises:
   a plurality of fuse signal generating means for generating a plurality of fuse signals by using fuses that can be cut; and
   a select signal generating means for outputting a plurality of select signals by using the plurality of the fuse signals.

4. The temperature detecting circuit as claimed in claim 3, wherein the fuse signal generating means comprises:
   a fuse connected between a power supply terminal and a first node, wherein the fuse can be cut by the fuse information;
   a first transistor connected between the first node and a ground terminal, and driven by an enable signal;
   a second transistor connected in parallel to the first transistor;
   a first inverter connected between the first node and a second node, wherein the output of the first inverter is inputted to a gate terminal of the second transistor and becomes the fuse signal at the same time; and
   a second inverter for inverting the fuse signal to generate a fuse bar signal.

5. The temperature detecting circuit as claimed in claim 3, wherein the select signal generating means comprises:
   a plurality of NAND gates for performing a NAND operation for the plurality of the fuse signals and their inverse signals; and
   a plurality of inverters for inverting the output signals of the NAND gate to output the select signals.

6. A temperature detecting circuit, comprising:
   a first delay means for outputting a reference signal that is delayed by some time according to an input signal without being affected by variation in temperature;
   a second delay means for delaying the input signal in different delay time according to variation in temperature to generate a plurality of delay signals;
   a detecting means having a plurality of detectors which compare the reference signal and each of the delay signals, and generate a plurality of detecting signals corresponding to the result of the comparison;
   an encoder for encoding the plurality of the detecting signals into given numbers of output signals;
   a buffer for transferring the output signal of the encoder to the outside; and
   a select means having a plurality of fuses that can be cut in response to a fuse information, for outputting a plurality of output signals in response to cutting state of the fuses to the detecting means,
   wherein the detecting means outputs one of the detecting signals in response to the output signals of the select means after the fuses of the select means are cut in response to the fuse information.

7. The temperature detecting circuit as claimed in claim 6, wherein the detecting means further comprises a plurality of transfer gates having the same number as the detectors, for outputting one of the plurality of the detecting signals in response to the output signal of the select means.

8. The temperature detecting circuit as claimed in claim 6, wherein the select means comprises:
   a plurality of fuse signal generating means for generating a plurality of fuse signals by using the fuses that can be cut; and
   a select signal generating means for outputting the plurality of output signals inputted to the detecting means by using the plurality of the fuse signals.

9. The temperature detecting circuit as claimed in claim 8, wherein the fuse signal generating means comprises:
   a fuse connected between a power supply terminal and a first node, wherein the fuse can be cut by the fuse information;
   a first transistor connected between the first node and a ground terminal, and driven by an enable signal;
   a second transistor connected in parallel to the first transistor;
   a first inverter connected between the first node and a second node, wherein the output of the first inverter is inputted to a gate terminal of the second transistor and becomes the fuse signal at the same time; and
   a second inverter for inverting the fuse signal to generate a fuse bar signal.

10. The temperature detecting circuit as claimed in claim 8, wherein the select signal generating means comprises:
    a plurality of NAND gates for performing a NAND operation for the plurality of the fuse signals and their inverse signals; and
    a plurality of inverters for inverting the output signals of the NAND gate to output the select signals.

11. A method of detecting a temperature, comprising the steps of:
   generating a reference signal which is not affected by variation in temperature using first delay means, and delay signals having a different delay time, respectively, in response to variation in temperature using second delay means;
   generating detecting signals using a detecting means in response to the result of the comparison between the reference signal and each of the delay signals;
   providing a fuse information corresponding to the detecting signals;
   programming a select means in response to the fuse information, and then outputting output signals of the select means according to a program state; and
   outputting one of the delay signals of the detecting means in response to the output signals of the select means.

* * * * *